H. G. STIEBEL.
Street Sprinkler.

No. 125,346. Patented April 2, 1872.

Witnesses.
E. H. Bates
G. E. Upham.

Inventor.
Henry G. Stiebel
Chipman Hosmer & Co
attys

UNITED STATES PATENT OFFICE.

HENRY G. STIEBEL, OF CINCINNATI, OHIO.

IMPROVEMENT IN STREET-SPRINKLERS.

Specification forming part of Letters Patent No. 125,346, dated April 2, 1872.

*To all whom it may concern:*

Be it known that HENRY G. STIEBEL, of Cincinnati, in the county of Hamilton and State of Ohio, has invented a new and valuable Improvement in Street-Sprinklers; and he does hereby declare that the following is a full, clear, and exact description of the construction and operation of the same, reference being had to the annexed drawing making a part of this specification, and to the letters and figures of reference marked thereon.

Figure 1:
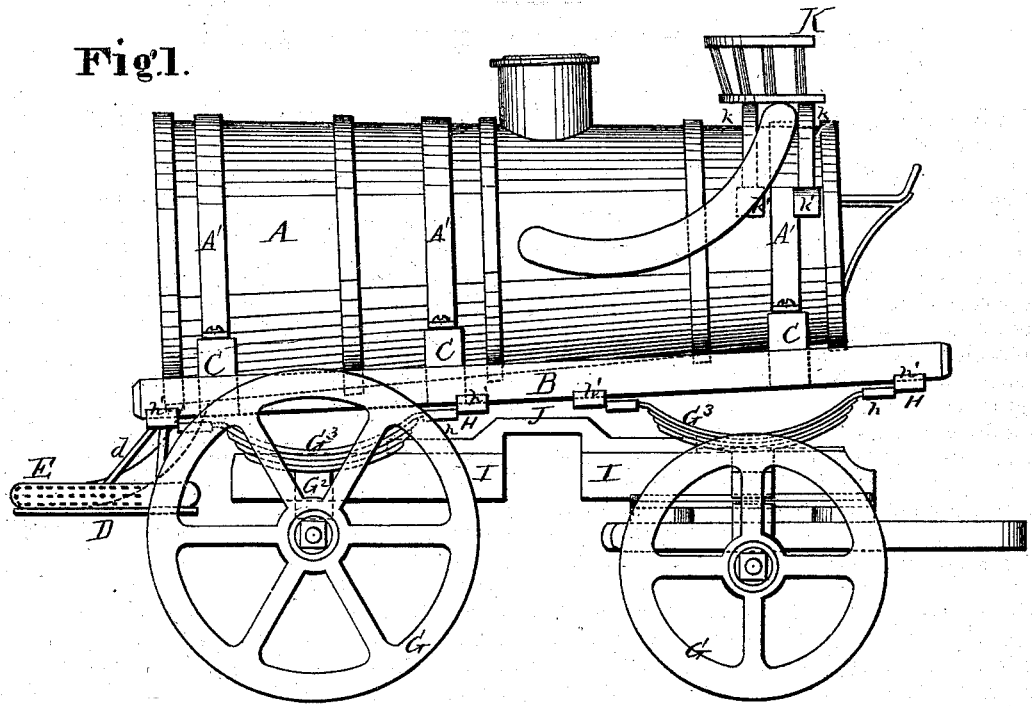
Figure 2:
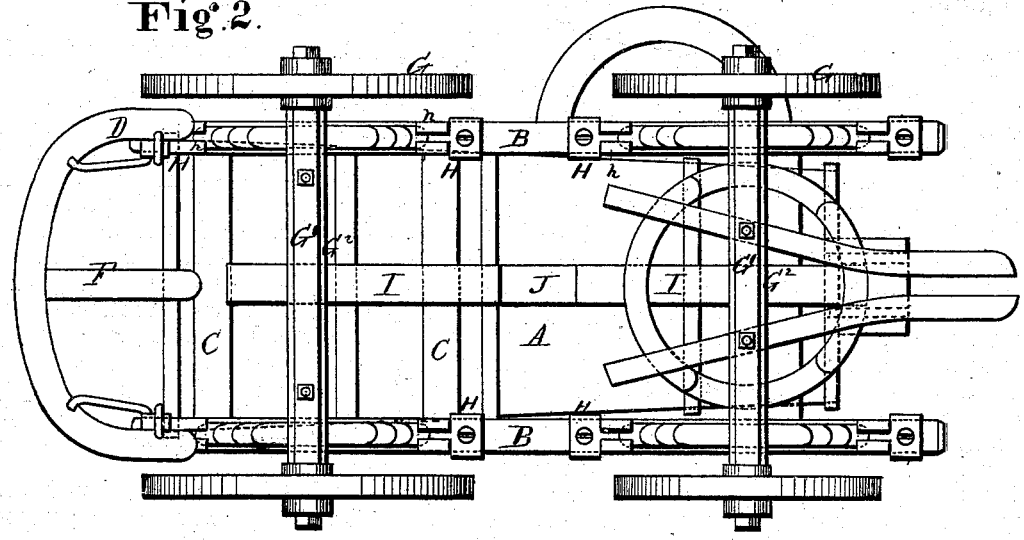

Figure 1 of the drawing is a representation of a side elevation of my invention. Fig. 2 is an under-side view of the same.

This invention has relation to spreet-sprinklers; and the novelty consists in the construction and arrangement of the water-tank, whereby a greater pressure is produced at its rear end.

In the accompanying drawing, A represents the water-tank of a street-sprinkler. This tank is of a rounded form and tapering, being wider at its rear than at its forward end, so that a greater pressure will be produced at its rear end, from which it discharges. Thus the streams from the sprinkling-pipe will be thrown further. The shape of the tank gives it an inclined bottom, which allows it to be completely emptied. The water-tank A rests on a frame composed of the side bars B and the cross-braces C, the latter being cut out to coincide with the form of the tank. The tank A is held in place by means of metallic bands A′, the ends of which are secured to the bars C in such a manner that they may be readily taken off, allowing the tank to be removed. By having the tank removable the vehicle may be used as a truck. The manner in which the frame, consisting of the bars C B, is arranged admits of its easy removal, so that an ordinary wagon-body may be placed on the springs. From the rear end of said frame a bracket, D, depends and supports the bent jet-pipe E, which is supplied from the tank by means of a pipe, F, centered in a notch in the rear tie. G designates the wheels of the sprinkler, $G^1$ the axles, $G^2$ the bolsters, and $G^3$ the springs. The springs are of the semi-elliptic form, and are secured to the bolsters G at the ends thereof.

H represents plates secured rigidly to the under sides of the bars B. On said plates are formed the bent flanges $h$. The ends of the springs pass between the flanges $h$ and the under surfaces of the plates, and are thereby held in place, although allowed longitudinal play to admit of the proper motion of the springs. I denotes the reach-pole, made in two sections, which are united by an arched plate of metal, J. In turning the vehicle one of the front wheels passes under the arch, allowing the vehicle to be turned within a narrow space. K designates the driver's seat, resting on springs $k$, the ends of which are supported by socketed brackets $k'$, which are secured to the sides of the water-tank, and which allow the ends of the springs $k$ slight play, according as the springs rise and fall.

It will be observed that the plates H are flanged at $h'$, so that their attachment to the bars B is rendered more secure. The arms $d$ of the bracket D rest on the plates H nearest the rear end of the vehicle, sockets being formed in the bars B to receive the bent ends of said arms.

What I claim as my invention, and desire to secure by Letters Patent, is—

1. A street-sprinkler having the removable conical tank A arranged with its bottom inclined downward and rearward, the lateral bars B connected by transverse rests C having graduated and beveled concavities, the straps A′, rest D, and sprinkler E, with its feed-pipe $d$ centered in a notch in the rear tie, all substantially as specified.

2. The wagon for street-sprinklers, having the axles $G^1$, sectional couplings I, arched coupling-plate J, reversible springs $G^3$, loops H, and bed, consisting of the side bars B, ties C, with graduated and beveled concavities, and sprinkler-rest D, all substantially as shown and described.

In testimony that I claim the above I have hereunto subscribed my name in the presence of two witnesses.

HENRY G. STIEBEL.

Witnesses:
JAMES CAMPBELL,
WILLIAM N. WEBLES.